US006952914B2

(12) United States Patent
Zehavi et al.

(10) Patent No.: US 6,952,914 B2
(45) Date of Patent: Oct. 11, 2005

(54) DEFLECTOR FOR TREE-FRUIT HARVESTER

(76) Inventors: Eitan Zehavi, 12 Alenim Str., 36041 Kiryat Tivon (IL); David Chiel, 21 Glvat Hamore Str., 18750 Afula Illit (IL)

( * ) Notice: Subject to any disclaimer, the term of this patent is extended or adjusted under 35 U.S.C. 154(b) by 133 days.

(21) Appl. No.: 10/701,592

(22) Filed: Nov. 5, 2003

(65) Prior Publication Data

US 2005/0091958 A1 May 5, 2005

Related U.S. Application Data

(63) Continuation of application No. PCT/IL02/00353, filed on May 6, 2002.

(60) Provisional application No. 60/289,983, filed on May 10, 2001.

(51) Int. Cl.[7] ................................................ A01D 46/00

(52) U.S. Cl. ...................................................... 56/328.1

(58) Field of Search ................................ 56/328.1, 329, 56/330, 340.1

(56) References Cited

U.S. PATENT DOCUMENTS

| | | | | | |
|---|---|---|---|---|---|
| 3,477,215 | A | * | 11/1969 | Herbst | 56/328.1 |
| 3,541,773 | A | * | 11/1970 | Cate | 56/329 |
| 3,596,455 | A | * | 8/1971 | Adrian | 56/329 |
| 3,623,308 | A | * | 11/1971 | Nye | 56/340.1 |
| 3,706,187 | A | | 12/1972 | Toet | |
| 3,896,612 | A | * | 7/1975 | McHugh et al. | 56/329 |
| 4,123,238 | A | * | 10/1978 | Hegeman | 96/261 |
| 4,269,021 | A | * | 5/1981 | Friday | 56/329 |
| 4,414,795 | A | * | 11/1983 | Johnstone et al. | 56/340.1 |
| 4,986,065 | A | * | 1/1991 | Compton | 56/340.1 |
| 5,469,695 | A | * | 11/1995 | Zehavi et al. | 56/340.1 |
| 5,816,037 | A | | 10/1998 | Chiel et al. | |
| 6,321,643 | B1 | * | 11/2001 | Takikawa | 100/2 |

FOREIGN PATENT DOCUMENTS

| | | | | | |
|---|---|---|---|---|---|
| GB | 2028084 | A | * | 3/1980 | A01D/46/26 |
| WO | WO 01/35721 | A2 | | 5/2001 | |
| WO | WO 02/069693 | A2 | | 9/2002 | |

* cited by examiner

*Primary Examiner*—Thomas B. Will
*Assistant Examiner*—Alicia Torres
(74) *Attorney, Agent, or Firm*—Frishauf, Holtz, Goodman & Chick, P.C.

(57) ABSTRACT

A deflector (10) for collecting and guiding harvested tree-fruit is implemented for resilient recovery from collisions with obstacles in the field. The deflector is coupled in cantilever to boom harvester (4) mounted on a vehicle (2). The harvester has a telescopic boom (8) with a mobile portion (14) terminated by a clamp (6) able to move in horizontal and in vertical translation towards and along a tree trunk (T). The deflector is coupled to the mobile portion for slaved translation with the clamp. Implemented as an array of separate ribs (32) flexibly coupled together and made of flexible elastic plastic material such as fiberglass, the deflector is lightweight and flexes upon collision to resiliently recover shape after the collision. Being lightweight, the cantilever does not destabilize the vehicle. The structure and the materials of construction of the deflector prevent transmission of vibrations generated by the vibrator (12) used to shake the trunk when harvesting.

18 Claims, 3 Drawing Sheets

DEFLECTOR FOR TREE-FRUIT HARVESTER

This application is a Continuation Application of International Application PCT/IL02/00353 filed 06 May 2002, which claims the benefit of U.S. Provisional Application Ser. No. 60/289,983 filed May 10, 2001.

BACKGROUND

1. Technical Field

The present invention relates in general to harvesting performed by a tree-fruit harvester carried by a vehicle and in particular, to equipment for deflecting harvested fruit away from the vehicle.

2. Prior Art

U.S. Pat. No. 5,469,695 granted to Zehavi et al., hereafter '695, for a tree shaking and harvesting apparatus is hereby incorporated by reference in whole. In the disclosure, Zehavi et al. present a tilted-plane face 18 for collecting and for guiding the harvested fruit, with an extension of steel rods 22. When in field use, the steel rods 22 vibrated severely and broken in collision with obstacles. Collisions of rods 22 with low-hanging branches and other obstacles currently occur. Sometimes, rather small twigs give way to the forces moving the rods 22 and the shaker 10, which forces are applied by a powerful hydraulic jack. Most of the time, a rigid obstacle, such as a tree-trunk, roots protruding out of the ground, or a big low-hanging branch, will resist the motion of the rods 22 that are then irreparably damaged.

Obviously, the equipment made of steel, is reinforced for better collision survival, but then, inevitably, becomes heavier. Being mounted in overhang alongside the vehicle, as are the oscillation units 15*a* and 15*b*, the vehicle becomes heavily destabilized, which is a second problem. Further, the sturdily reinforced equipment suffers from the rather violet vibrations of the oscillation units, and tends to develop cracks the propagate quickly until total failure.

In U.S. Pat. No. 4,986,065 to Compton, the same problem is solved by adding extensions to fruit catch platforms 38 provided to collect harvested fruit. For example, seal panel 54, is operated by rams 58 that are lowered for harvesting and raised afterwards. Such a solution copes with collisions in a rather complex and expensive manner. Furthermore, it is left to the operator to remember to operate the seal panels in the proper sequence so as to avoid mutual collision.

There are thus many problems to overcome before the introduction in the field of a practical harvested fruit collector for use the tree-harvesting equipment.

SUMMARY

In accordance with the invention, there is provided a deflector for collecting fruit when harvesting trees, the deflector being able to elastically deform upon collision with an obstacle and to recover shape after the collision.

In further accordance with the invention, the deflector consists of an array of independent ribs coupled to deflect individually as separate elements.

Moreover, in accordance with the invention, there is provided a deflector with rib structures made of flexible elastic and lightweight plastic material, to prevent destablization of the vehicle on which the harvester is mounted in cantilever.

Still further, in accordance with the invention, there is provided a deflector with a structure and materials of construction designed for dampening the vibrations generated by the vibration unit of the harvester.

In addition, in accordance with the invention, thee is provided a deflector with releasable joints to permit replacement in situ of a rib.

It is an object of the present invention to provide a deflector for collecting and guiding harvested tree-fruit, the deflector being coupled to a bottom harvester mounted on a vehicle, the harvester comprising:

- a telescopic boom extending away from the vehicle, and comprising a mobile portion with a free end terminated by a clamp configured for movement in longitudinal and in vertical translation towards and along a trunk of a tree with foliage, and the deflector comprising:

- a deflector structure for extending under the tree foliage, characterized in that:
- the deflector is coupled away from the vehicle in cantilever to and above the free end of the mobile portion, in slaved longitudinal and vertical translation with the clamp, for extension on opposite sides and proximate the trunk,
- the deflector structure is coupled in overhang alongside the vehicle and configured to extend to approximate the tree trunk and longitudinally sideways from opposite sides of the trunk, and
- the deflector structure is configured to sustain flexible elastic deformation in collision with an obstacle, and for resilient elastic recovery of deflector structure shape after collision.

The deflector consists of an array of ribs coupled in equally spaced-apart aligned parallel distribution as a grid, forming a slanted deflector surface, wherein each rib is flexibly coupled to permit separate deflection in elastic deformation.

The deflector structure is of rectangular top elevation and has a backbone and at least one longeron running in parallel along the length of the deflector. These are coupled to each rib crossing the width of the deflector. Each rib has a rib structure built as a truss supporting elastic deformation. The longeron and the rib structure are constructed out of elastically flexible plastic material for elastic deformation during collision with an obstacle, and for elastic recovery of rib structure and longeron shape after collision. If desired, the array of ribs is mutually coupled to more than one longeron parallel to the backbone.

It is another object of the present invention to provide a deflector with a backbone having a longitudinal rigid unitary beam with a lateral cross-section featuring a height with a top portion, a middle and a bottom portion. The rib structure comprises an upper member and a lower member in perpendicular to the backbone and to the at least one longeron. The lower member is in alignment below the upper member. The upper member comprises a lower portion, an intermediate bend and an upper portion. The upper member is joined at the intermediate bend, in perpendicular to the unitary beam, at the middle and top portion so that the upper portion is cantilevered to extend upwards off the vertical and away from the backbone to comprises a free hanging upper extremity. The lower portion is cantilevered to extend slantingly downwards and away from the backbone towards the trunk and comprises a free hanging lower extremity. The upper member is configured for resilient elastic recovery of shape after either any of both the free hanging upper extremity and the free hanging lower extremity collides with an obstacle.

It is a further object of the present invention to provide a deflector with a lower member having a first back extremity joined from below to the bottom portion of the lateral cross-section, and a second front extremity joined from below to the upper member, about midways between the backbone and the free hanging lower extremity to form a truss tip. The longeron is joined transversally to and between the upper and the lower member about midways between the backbone and the truss tip. There are thus defined in the rib structure a plurality of sections with each one section out of the plurality of sections extending between each adjacent two joints in the upper member and in the lower member. When the deflector collides with an obstacle, at least one section of the rib structure deflects in flexible deformation selected alone and in combination from the group consisting of bending, buckling, and torsion, and the backbone is accommodated to flexibly deform in torsion. It is noted that the deflector is made from a combination of non-metallic materials with metallic materials and of non-metallic materials. Reinforced plastic materials, such as fiberglass, are suitable for the task. The backbone is configured as an open beam profile, thus an open shape as opposed to a closed beam profile, such as a closed polygon, if desired, of metal or of fiberglass.

In accordance with the invention, the rib structure is made from materials selected from reinforced plastic materials, synthetic materials, and composite materials, but such as fiberglass, joined releasably to permit replacement in situ. It is preferable to use material lighter than aluminum and to provide a lightweight structure design in addition to the lightweight materials, to prevent destabilization of the vehicle. The weight of the platform, when extended away from the vehicle towards the trunk creates a destabilizing movement of the vehicle.

It is yet an object of the present invention to provide a method for implementing a deflector resistant to collision, the deflector being coupled to a boom harvester mounted on a vehicle for collection and guidance of harvested tree-fruit. The harvester has a telescopic boom extending away from the vehicle, and a mobile portion with a free end terminated by a clamp configured for movement in longitudinal and in vertical translation towards and along a trunk of a tree with foliage:

a deflector structure for extending under the tree foliage,

The steps of the method call for coupling the deflector away from the vehicle in cantilever to and above the free end of the mobile portion, in slaved longitudinal and vertical translation with the clamp. The deflector extends under the tree foliage and to opposite sides of the trunk and proximate thereto. By the method, the deflector structure is configured to sustain flexible elastic deformation in collision with an obstacle, and for resilient elastic recovery of deflector structure shape after collision.

It is yet an object of the present invention to provide a harvesting system comprising a deflector coupled to a boom harvester mounted on a vehicle, the deflector for collecting and guiding the harvested tree-fruit. In this case to, the harvester has a telescopic boom extending away from the vehicle, and comprising a mobile portion with a free end terminated by a clamp configured for movement in longitudinal and in vertical translation towards and along a trunk of a tree with foliage. The deflector comprises a deflector structure in overhang alongside the vehicle, the deflector being configured to extend under the tree foliage to proximate the trunk and longitudinally sideways from opposite sides of the trunk. The deflector is coupled to and above the mobile portion of the telescopic boom and slaved to the longitudinal and vertical translation of the mobile portion. Furthermore, the deflector structure is configured to sustain elastic deformation upon collision with an obstacle encountered during translation, to prevent mechanical damage of the deflector, and for elastic recovery of deflector shape after the collision.

BRIEF DESCRIPTION OF THE DRAWINGS

In order to understand the invention and to see how it may be carried out in practice, a preferred embodiment will now be described, by way on non-limiting example only, with reference to the accompanying drawings, in which.

DISCLOSURE OF THE INVENTION

The problem to be solved consists of providing a deflector, or a collection and guiding deflection platform that will receive and guide harvested fruit. First comes the need to prevent gathering of fruit under or close to the harvesting vehicle. Second, the fruit is guided towards a conveyor or to a loading site.

The solution of the problem is presented as a flexible and elastic deflector, or platform surface, built as a single unitary construction made mainly or entirely from lightweight reinforced plastic material, for use with a tree-fruit boom harvester, briefly described below.

In a copending PCT Patent Application No. PCT/IL02/00147, by Zehavi et al., referred to hereafter as '147, there is described a boom harvester for use with the flexible deflector. FIG. 2 in a '147 offers an isometric view of the disclosed harvester showing a structure portion IV for mounting the harvester to a carrying vehicle, and for supporting a bi-directional telescopic boom 16. A clamp with clamping jaws 2 is attached to the extremity of the extensible member 20 of the telescopic boom 16. One of the jaws of the clamp 2 contains a vibrator whereby a tree trunk is shaken when both jaws are clamped on diametrically opposite sides of a tree-trunk, as shown in FIG. 1 of '147. In operation, the boom harvester stops opposite a tree to be harvested, extends the clamp 2 attached at the extremity of the extensible member 20 towards and along the trunk, that is then clamped for shaking.

In the present inventions, the flexible deflector is intended for mounting to and above the extensible member of the boom harvester for translation together with the clamp wherein the vibrator is integrated inside one of the jaws.

Figure 1A:
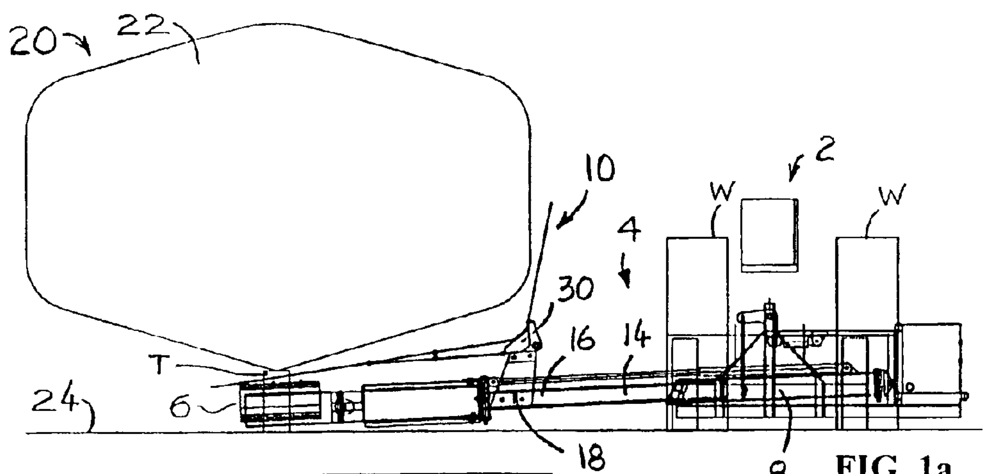
FIG. 1*a* and FIG. 1*b* are respectively a side elevation and a top elevation of a flexible deflector mounted on a boom harvester.
Figure 1B:
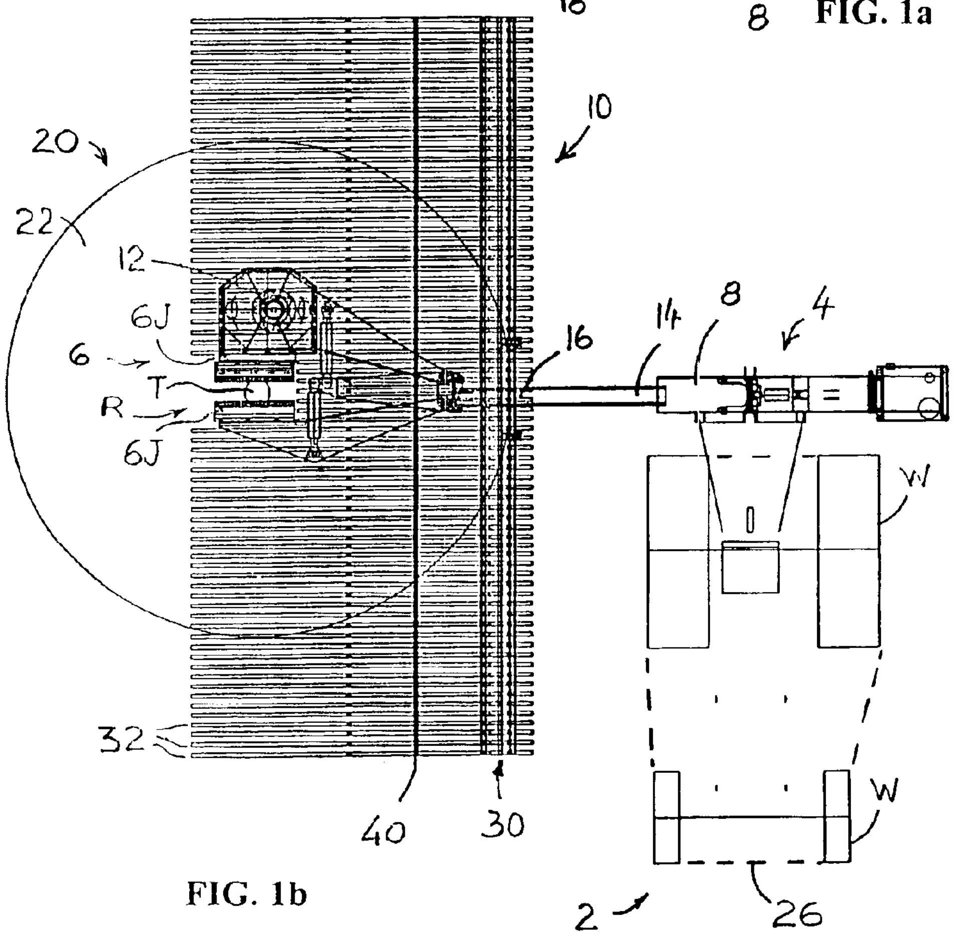
Figure 2:
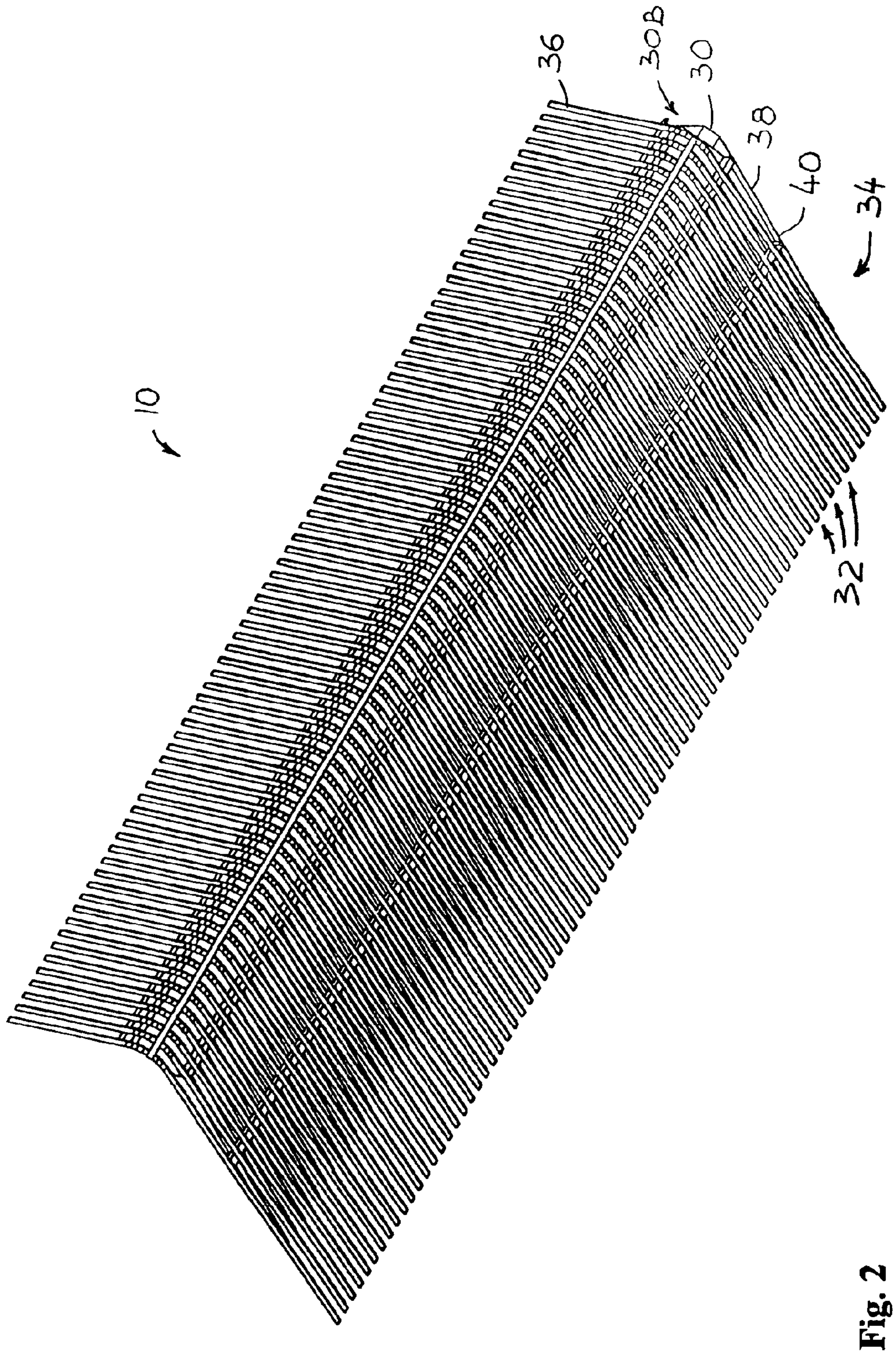
FIG. 2 is an isometric elevation of the flexible deflector illustrated in FIG. 1.

With reference to FIGS. 1*a* and 1*b,* of the present disclosure, there is shown a vehicle 2, carrying a boom harvester 4 with a clamp 6 attached to the telescopic boom 8, and the flexible deflector 10. A vibrator 12 is integrated inside one of two jaws 6J of the clamp 6, as disclosed in a further copending application No. PCT/IL 00/00716. The telescopic boom 8 has a mobile portion 14 with a free end 16 to which the clamp 6 is attached and above which the deflector 10 is coupled in cantilevered at an attachment place 18. There is shown a tree 20 wit tree foliage 22 above the trunk T, that protrudes from the ground 24.

The mobile portion 14 is controllable, by means not shown in the FIGS., for translation of the open jaws 6J of the clamp 6, horizontally towards and vertically along the trunk T, which jaws are then clamped, as shown in the FIGS. 1*a* and 1*b,* on diametrically opposite sides of the trunk.

Evidently, since both the clamp 6 and the flexible deflector, or deflector 10, are attached above the free end 16 of the mobile portion 14, they are also slaved to translate together. However, as the deflector 10 is mounted above but somewhat backwards over the jaws 6J, the extremity of deflector will not hit the trunk T when this last one is clamped.

With reference to FIG. 1*b,* the deflector 10 is shown to practically fill the gap between the vehicle 2 and the trunk T, and to extend on both sides of the tree 20 further outwardly than the outer dimensions of the tree foliage 22, and underneath thereof.

Many impediments confront the implementation of a practical flexible deflector 10. Basically, the functional demands require a large deflector surface, of reasonable weight, but a deflector structure sturdy enough to successfully survive the harsh work conditions encountered during operation of the equipment.

Traditionally, the conventional approach employed for agricultural gear operating in heavy-duty field conditions is to strength and ruggedize, by adding structural steel mass to the equipment. However strongly built, the heavy weight of added metal is ill suited for the implementation of a practical deflector as this added load imposes unacceptable penalties. Hence, departing from standard procedures, a new approach is embraced and instead of steel for strength, engineering plastic materials are considered, for elastic flexibility, high strength, resiliency, and light weight. Advantage is taken from the properties of the material, in combination with superior structural design.

A flexible deflector made from fiberglass for example, will easily assume the required dimensions and the functional demands to be met, while featuring reduced weight.

An illustration of the problems encountered in operation will better explain the descriptions that follow. For example, before shaking of the trunk T for harvesting, the clamp 6 is translated towards and along the tree trunk T, and clamped thereon. It is during this horizontal translation and vertical positioning stage that the flexible deflector 10, moving in slaved association with the clamp 6, very often inevitably collides with obstacles, not shown in the schematic FIGS. 1*a* and 1*b*. Since the clamp 6 is translated by a powerful hydraulic jack, not shown in the Figs., that also moves the flexible deflector 10, huge forces develop on the deflector 10 upon collision, and it is either the obstacle or the deflector 10 that give way. The obstacles which may collide with and break the deflector 10 are manifold. Sometimes, the operator misses the trunk T, thereby crashing the deflector 10 into that trunk, whereafter the deflector 10 is retrieved from service, and so is the bottom harvester 4. Other obstacles counting as potential danger to the flexible deflector 10, are low hanging branches, stumps from broken trees, outgrowths of roots extending above the ground 24, rocks and other protrusions found in the field but not shown in the Figs. It is described below how a flexible deflector structure combined with flexible elastic elements allows the deflector 10 to deform elastically in bending, buckling and torsion, and to regain original shape after collision.

Furthermore, when the mobile portion 14 of the telescopic boom 8 is translated outwards, the extended elements, namely, the clamp 6, the deflector 10 and the mobile portion itself, all extend out of the footprint 26 of the vehicle 2. The footprint 26 of the vehicle 2 is defined as the top elevation surface delimited by the area between the wheels W, or of the caterpillars, not shown in the Figs. The weight of the extended elements, all cantilevered and hanging outside of the footprint 26, exerts a destabilizing moment on the vehicle 2. To this end also, an enhanced deflector structure and the use of reinforced plastic material allow the implementation of a lightweight deflector 10, as described below.

Another hurdle to overcome is the destructive effect of the vibrations transmitted by the vibrator 12. With standard prior art solid metal-mass deflectors, the violent vibration regime induced by the vibrator, initiates cracks that propagate and finally destroy the equipment. The combination of plastic material and deflector structure dampen the vibrations and resolve the problem, as described below.

Moreover, should replacement of an element be required, it is important to ensure repair of the deflector in situ, fast and at low cost. This request is fulfilled by the lightweight plastic material array of separate rib elements and by the releasable joints use to assemble the structure of the deflector 10.

In short, the solution provided by the present invention is a flexible and elastic single-piece collection and guiding platform 10, made of lightweight plastic material. In practice, the flexible deflector 10 weights between one fourth to one-third in comparison with equivalent implements, due to both the choice of materials and to the method of construction selected. Upon collision with an obstacle, parts especially designed to flex, return to their original shape after the collision. The combination of platform structure with plastic material permits the realization of a lightweight platform 10 that does not destabilize the vehicle 2. Moreover, the inherent dampening properties of plastic material reduce the vibrations generated by the vibrator 12. Furthermore, releasable joints allow replacement of members in situ.

DESCRIPTION OF PREFERRED EMBODIMENTS

Figure 3:
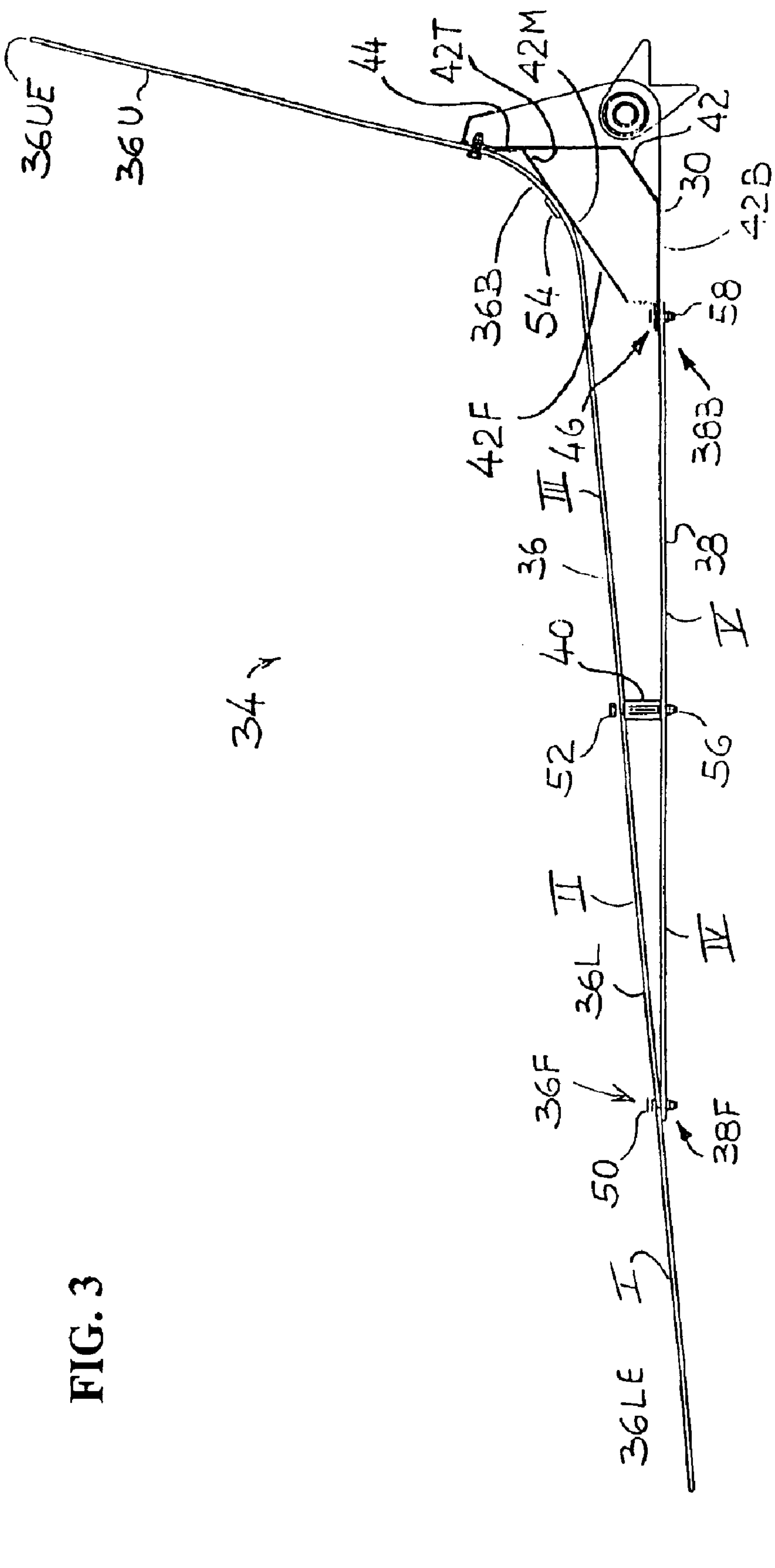
FIG. 3 is a side view of the flexible deflector shown in FIG. 1.

With reference to the FIGS. 1 to 3, the structure of the deflector 10 is now described.

The schematic FIGS. 1*a* and 1*b* present the flexible deflector 10, or deflector 10, which appears in top elevation as a rectangular skeleton with a longitudinal backbone 30, a longeron 40 spaced apart and parallel thereto, and an array of lateral ribs 32, in perpendicular to the backbone. The backbone 30 and the longeron 40 span the entire length of the deflector 10 and each rib 32 traverses the whole width thereof.

FIGS. 1*a* and 1*b* illustrate the various elements of the system cooperating for tree-fruit harvesting. A vehicle 2 supports laterally mounted telescopic boom 8 extending outwards and away from the vehicle, ending in a mobile portion 14 terminated by a clamp 6. The mobile portion 14 is the extensible and retractable portion of the telescopic boom 8. A vibrator 12 is integrated in one of the two jaws 6J constituting the clamp 6, seen to firmly grab diametrically opposite side of the tree trunk T. The deflector 10 is fixedly coupled in cantilever to and above the free end 16 of the mobile portion 14, at attachment place 18, and covers the telescopic boom 8, the mobile portion 14 and most of the clamp 6. Mounted in parallel to the vehicle 2, the deflector 10 penetrates from the side and under the foliage 22 of the tree 20. Sideways, the width of the deflector 10 reaches out to cover a surface between the vehicle 2 up to proximate and almost abutting the tree-trunk T, and in lateral extension, the length of the deflector spreads away from the diametrically opposite sides of the trunk to well beyond the plan view of the foliage 22. As the deflector 10 slopes downwards from the side of the vehicle 2 towards the trunk T, fruit dropping thereon is collected and guided away from the vehicle.

The array of aligned parallel ribs 32, forming the fruit receiving surface of the deflector 10, is spaced apart in equal distribution to cover a rectangular surface as long as the backbone 30 and as wide as the length of the top elevation of a rib 32.

The parallel interstices between consecutively aligned ribs 32 are as wide a possible to alighten the structure of the deflector 10 and to dispose of fruit of unwanted small dimensions, but narrow enough to collect and guide the harvested fruit as desired.

The structure of the flexible deflector 10 is better seen in the isometric view of FIG. 2 that illustrates the assembled array of aligned, equidistant, closely separated parallel rib (truss) structures 34, which form the ribs 32. The horizontal backbone 30, crossing the length of the deflector 10, which is the largest single element, is designed as a hollow closed profile to which are coupled an upper member 36, a lower member 38 and the longeron 40 to these last two. The array of upper members 36 and lower members 38 form the fruit collection and guiding platform surface of the deflector 10. Similar reference numerals refer to similar elements in the various Figs.

Referring to the side elevation of the rib structure 34 of FIG. 3, the upper member 36 is configured in the shape of an elbow featuring an upper portion 36U and an intermediate bend, or bend 36B, both coupled to the backbone 30. A lower portion 36L, is coupled to the longeron 40 and to the lower member 38.

The upper portion 36U of the upper member 36 is directed upwards, somewhat off the vertical, towards the supporting vehicle 2, seen in FIGS. 1, while the lower portion 36L slopes downwards, towards the trunk T, seen in FIGS. 1, in inclination to the horizontal. Both the upper member 36U and the lower member 36L are cantilevered to the horizontal backbone 30 and have their extremities 36LE and 36UE hanging freely away from the backbone.

According to FIGS. 1, the side of the deflector 10 close to trunk T is called front, or forward, and the opposite side, near to the vehicle 2, is referred to as back, or rear.

The backbone 30 has a lateral hollow cross-section 42 implemented of bent sheet metal, to form a rigid unitary beam of constant cross-section. If desired, the backbone 30 is made of plastic material, synthetic material or composite material, with fiberglass being an example. The transverse cross-section 42 of the backbone 30 may consists of a customer made profile or of a stock item profile. When made of sheet metal, it is easy to bend the backbone 30 to a cross-section 42 in the general shape of a polygon. As desired, the backbone 30 is designed either as a closed cross-section 42, or as an open beam cross-section, not shown in the Figs. Direction-wise the cross-section 42 has a front 42F oriented towards the trunk T, a top portion 42T, a middle portion 42M, and a bottom portion 42B.

Together, the backbone cross-section 42, the upper member 36, the lower member 38 and the longeron 40 define the rib truss structure 34, where the intermediate bend 36B of the upper member 36 is attached to the top portion 42T and to the middle portion 42M of the front of the cross-section 42F. More accurately, the bend 36B is rigidly joined to a top projection 44 extending upwards from the top portion 42T of the cross-section 42.

The lower member 38 is rigidly joined at the back extremity 38B to a bottom projection 46 at the front of the cross-section 42F and has a front extremity 38F than is fixedly joined to the front portion 36F of the upper member 36. If desired, the rigid and fixed joints of the elements of the rib structure 34 are releasable, to allow easy and fast replacement in situ.

The rib truss structure 34 is now seen to consist of five different sections, designed from I to V, as follows. I: in the upper member 36, from the lower extremity 36LE to the attachment point 50 that forms a truss tip where front extremities of the upper and of the lower members, namely 36F and 38F are joined; II: from the attachment point 50 or joint 50, to the fixation point 52 where the lower portion 36L forms joint with the longeron 40; and III: from the longeron 40 to the joint 54 on the middle portion 42M on the front 42F of the cross-section 42. On the lower member 38 section IV: from the attachment point 50 or joint 50 to the joint with the longeron 40 at joint point 56; and section V: from joint point 56 to the attachment point 58 or joint 58, on the front 42F of the bottom portion 42B of the cross-section 42.

The longeron 40 is joined in perpendicular to both the upper and the lower member, respectively 36 and 38, at about half the distance between the bend 36B and the lower portion extremity 36LE. The front extremity 38F of the lower member 38 is fixedly joined to the lower portion 36L at about half distance between the longeron 40 and the lower portion extremity 36LE.

In the middle of the length of the backbone 30, as seen in FIGS. 1, at an attachment place 18, the flexible deflector 10 is secured to the mobile extensible member 14 of the telescopic boom 8 mounted on the vehicle 2, in conventional manner, known to the art, and therefore not described.

The truss components, defined above as the cross-section 42, the upper member 36, the lower member 38 and the longeron 40 are made from reinforced plastic material, or composite materials, or of other engineering synthetic materials, such as fiberglass. The term fiberglass is used as generic term. These materials are elastically flexible, thus with shape-recovery capabilities, and also lightweight and vibration dampening.

Both the upper and the lower member, respectively 36 and 38, are made from thin slats of fiberglass of the same width, or of different width, mutually aligned one above the other. When fruit such as say oranges, drop from the tree 20, thus from above on the upper member 36 of the deflector 10, the rib (truss) structure 34 flexes and absorbs the impact to prevent damage to the skin of the fruit. It is not only the upper member 36 that deflects, but also the lower member 38 together with the longeron 46 that deform, the latter supporting the neighboring rib truss structures 34, which also participate in the shock absorbing process. Therefore, the shock of the fall of fruit just above the longeron 40 will also be absorbed not only by the deflection of the rib (truss) structure 34, but also by the participation of the whole structure of the deflector 10.

Fruit falling on the deflector 10 are received on the array of flexible ribs 32, which are aligned to form a surface that is concave towards the tree 20, but sloping downwards to guide the fruit away from rolling under and close to the vehicle 2.

It was explained above under what circumstances the platform 10 may collide with obstacles, and the results from such collisions will now be described.

When the lower extremity 36LE which is part or section I of the upper member 36, crashes into an obstacle, such as a tree trunk, a stump, roots or low hanging branches, that extremity flexes elastically and deforms. The original shape of the lower extremity 36LE and of section I are resiliently recovered after the collision. The deformation of the fiberglass slat forming the upper member 36 is elastic, regardless whether the deformation resulting from the collision is either one of, or a combination of bending, buckling, and torsion. Considering a single rib (truss) structure 34, a load on the lower extremity 36LE, stresses not only the sections I to II of the upper member 36, but also the sections IV and V of the lower member 38, the longeron 40 and the backbone 30. Therefore, when section I collides flexes in a deformation mode, such as bending, buckling, torsion or a combination thereof, one or more of the other sections from II to V included, may respond in a single or combination of deformation modes, as cited above. It is the whole rib (truss) structure 34 that participates in reaction to the collision, to resiliently recover original shape after the collision.

Each one of the sections I to V may flex independently in any simple, combined or complex mode of bending, buckling, or torsion in one or more deflection mode curves ranging from a half sine wave to a multiple of half sine waves. The pair of endpoints of each section I to V, thus the joints of those sections, are in fact a pair of nodes. Various modes of deflection may develop between each pair of nodes. Depending on the stress developed during a collision, each section I and V, in simple or complex mode of deformation, performs as an elastic energy absorbing section, with torsion possibly superimposed on top of bending and buckling. Original shape is recovered after the collision.

Since the cantilevered upper portion 36U may get entangled with the foliage 22 or hit low hanging branches, the same afore-cited modes of deformation may apply. Evidently, the upper portion 36U, also made from fiberglass, will elastically recover to regain its original shape.

The deflector 10 also participates as a unitary structure upon collision. In addition to the deflection of each single rib 32 and of a plurality of ribs 32, the whole structure is linked by the backbone 30 and by the longeron 40. Deformations are transmitted lengthwise, and although the backbone 30 is a rigid unitary beam, it is nevertheless hollow and deforms in elastic torsion that will recover from the deformation after the collision. The backbone 30 thus also supports and is actively involved in backing-up and recovery of original shape after the collision.

Together, the plastic materials from which the deflector 10 is built and the structure of separated ribs 32 and hollow backbone 40, collaborate to achieve a lightweight deflector to prevent destabilization of the vehicle 2, since the deflector is coupled in overhang out the footprint 26 of the vehicle. The more the mobile portion 14 is extended, the larger the destabilization moment imposed on the vehicle 2. It is therefore beneficial that by the method of the present invention, both the structure of the deflector 10 and the plastic materials of construction thereof reduce the weight to about 25% of that of conventional prior art deflectors.

The inherent flexibility and dampening properties of plastic materials, such as fiberglass, in combination with a backbone 30, made from sheet metal or of plastic material, and of the joints of the sections I of V of the rib structures 34, all participate to effectively dampen the vibrations generated by the vibrator 12 located in the clamp 6. Furthermore, should it be necessary, shock-absorbing elements or dampeners are easily added at the attachment place 18 of the deflector 10 to the mobile portion 14 and to joints of the sections I to V.

The flexible deflector 10 benefits from an additional advantage stemming from its mode of construction, which is the plurality of identical separate and lightweight elements attached to each other at only but very few joints of the sections I to V. Should it be desired to replace an upper member 36, or a lower member 38, they are easily removed, quickly replaced, and the longeron 40 is easily repaired by affixing a split extending on both sides of the failure point. It will be appreciated by persons skilled in the art, that the present invention is not limited to what has been particularly shown and described hereinabove. For example, the truss rib structure may be designed differently and there may be added more than one longeron. Rather, the scope of the present invention is defined by the appended claims and includes both combinations and subcombinations of the various features described hereinabove as well as variations and modifications thereof which would occur to persons skilled in the art upon reading the foregoing description.

What is claimed is:

1. A deflector structure for collecting and guiding harvested tree-fruit, the deflector being coupled to a boom harvester mounted on a vehicle, the boom harvester including a telescopic boom extending away from the vehicle, and comprising a mobile portion with a free end terminated by a clamp configured for movement in longitudinal and in vertical translation towards and along a trunk of a tree with foliage, and the deflector comprising:

a deflector structure for extension under the tree foliage, wherein:

the deflector is coupled away from the vehicle in cantilever above the free end of the mobile portion, in slaved longitudinal and vertical translation with the clamp, for extension on opposite sides and proximate the trunk;

the deflector structure is configured to sustain flexible elastic deformation in collision with an obstacle, and for resilient elastic recovery of deflector structure shape after collision; and an array of ribs coupled in equally spaced-apart aligned parallel distribution forming a slanted deflector surface, wherein each one of the ribs out of the array of ribs is flexibly coupled to permit separate deflection of each one rib in elastic deformation;

wherein the deflector further comprises a length and a width, and a backbone and at least one longeron coupled in spaced apart longitudinal parallel alignment along the length of the deflector to each one rib out of the array of ribs crossing the width of the deflector, each rib comprising:

a rib structure built as a truss configured for elastic deformation, the at least one longeron and the rib structure being constructed out of elastically flexible plastic material for elastic deformation during collision with an obstacle, and for elastic recovery of rib structure and longeron shape after collision.

2. The deflector according to claim 1, wherein:

the array of ribs is mutually coupled to the at least one longeron that comprises more than one longeron in parallel to the backbone.

3. The deflector structure according to claim 1, wherein:

the backbone comprises a longitudinal rigid unitary beam featuring a lateral cross-section having a height with a top portion, a middle portion and a bottom portion, and the rib structure comprises:

an upper member and a lower member perpendicularly coupled to the backbone and to the at least one longeron, the lower member residing in alignment below the upper member, and the upper member being configured to comprise a lower portion, an intermediate bend and an upper portion, wherein the upper member is perpendicularly joined at the intermediate bend to the unitary beam at the middle and top portion so that the upper portion is cantilevered to extend upwards off the vertical and away from the backbone and comprises a free hanging upper extremity, and the lower portion is cantilevered to extend slantingly towards and away from the backbone towards the trunk and comprises a free hanging lower extremity, wherein the upper member is configured for resilient elastic recovery of shape after either one or both the free hanging upper extremity and the free hanging lower extremity collide with an obstacle.

4. The deflector according to claim 3, wherein:

both the upper member and the lower member are elastically flexible in deformation selected alone and in combination from the group consisting of bending, buckling, and torsion.

5. The deflector according to claim 3, wherein the lower member comprises:

a first back extremity joined from below to the bottom portion of the lateral cross-section, and a second front extremity joined from below to the upper member, about midway between the backbone and the free hanging lower extremity to form a truss tip, and the longeron is transversally joined to and between the upper and the lower member about midway between the backbone and the truss tip, thereby defining in the rib structure a plurality of sections with each one section out of the plurality of sections extending between each adjacent two joints in the upper member and in the lower member, wherein upon collision with an obstacle, at least one section of the rib structure deflects in flexible deformation selected alone and in combination from the group consisting of bending, buckling, and torsion, and the backbone is accommodated to flexibly deform in torsion.

6. The deflector according to claim 1, wherein:

the deflector is made from either one of both a combination of non-metallic materials with metallic materials, and of non-metallic materials.

7. The deflector structure according to claim 1, wherein:

the backbone is configured as either one of two of an open beam profile and of a closed beam profile.

8. The deflector according to claim 1, wherein the backbone is made of sheet metal.

9. The deflector according to claim 1, wherein:

the rib structure is made from materials elected, alone and in combination, from the group consisting of reinforced plastic materials, synthetic materials, and composite materials.

10. The deflector according to claim 1, wherein the rib structure is made from material lighter than aluminum.

11. The deflector according to claim 1, wherein the rib structure is made from fiberglass.

12. The deflector according to claim 1, wherein the rib structure joints are releasably coupled to permit replacement in situ.

13. The deflector according to claim 1, wherein the deflector structure and materials of construction thereof are, respectively, configured for and selected appropriately to prevent destabilization of the vehicle when the deflector is extended away from the vehicle towards the trunk.

14. The deflector according to claim 1, wherein:

the clamp comprises at least two jaws with a vibrator integrated inside one of the at least two jaws for shaking the trunk when harvesting, and wherein:

the deflector structure and materials of construction thereof are, respectively, configured for and selected appropriately to dampen transmission of vibrations generated by the vibrator when shaking the trunk.

15. A method for implementing a deflector resistance to collision, the deflector being coupled to a boom harvester mounted on a vehicle for collection and guidance of harvested tree-fruit, the boom harvester comprising:

a telescopic boom extending away from the vehicle, and comprising a mobile portion with a free end terminated by a clamp configured for movement in longitudinal and in vertical translation towards and along a trunk of a tree with foliage, and the deflector comprising:

a deflector structure for extension under the tree foliage, the method comprising the steps of:

coupling the deflector away from the vehicle in cantilever to and above the free end of the mobile portion, in slaved longitudinal and vertical translation with the clamp, for extension on opposite sides and proximate the trunk;

configuring the deflector structure to sustain flexible elastic deformation in collision with an obstacle, and for resilient elastic recovery of deflector structure shape after collision;

coupling an array of ribs in equally spaced-apart and aligned parallel distribution to form a slanted deflector surface, wherein each one of the ribs out of the array of ribs is flexibly coupled to permit separate deflection of each one rib in elastic deformation;

wherein the deflector comprises a length and a width, and further comprising the steps of:

spacing apart in longitudinal a parallel alignment along the length of the deflector of a backbone and of at least one longeron coupled to each one rib out of the array of ribs crossing the width of the deflector, further comprising the step of:

building a rib structure configured as a truss for elastic deformation, and building the at least one longeron and the rib structure out of elastically flexible plastic material for elastic deformation during collision with an obstacle, and for elastic recovery of rib structure longeron shape after collision.

16. The method according to claim 15, further comprising the step of:

mutually coupling the array of ribs to the at least one longeron comprising more than one longeron in parallel to the backbone.

17. The method according to claim 16, further comprising the steps of:

configuring the backbone as a longitudinal rigid unitary beam featuring a lateral cross-section having a height with a top portion, a middle portion and a bottom portion, and in the rib structure:

perpendicularly coupling an upper member and a lower member to the backbone and to the at least one longeron, the lower member residing in alignment below the upper member, and configuring the upper member to comprise a lower portion, an intermediate bend and an upper portion, wherein the upper member is perpendicularly joined at the intermediate bend to the unitary beam at the middle and top portion so that the upper portion is cantilevered to extend upwards off the vertical and away from the backbone and comprises a free hanging upper extremity, and the lower portion is cantilevered to extend slantingly downwards and away from the backbone towards the trunk and comprises a free hanging lower extremity, wherein the upper member is configured for resilient elastic recovery of shape after either one of both the free hanging upper extremity and the free hanging lower extremity collide with an obstacle.

18. The method according to claim 17, further comprising the step of:

configuring both the upper member and the lower for elastic flexibility in deformation selected alone and in combination, from the group consisting of bending, buckling, and torsion.

* * * * *